(12) United States Patent
Bovaird

(10) Patent No.: US 7,288,187 B1
(45) Date of Patent: Oct. 30, 2007

(54) ORGANIC WASTE MANAGEMENT SYSTEM

(75) Inventor: Brian Bovaird, Tulsa, OK (US)

(73) Assignee: Bovaird & Co., Tulsa, OK (US)

( * ) Notice: Subject to any disclaimer, the term of this patent is extended or adjusted under 35 U.S.C. 154(b) by 0 days.

(21) Appl. No.: 11/163,748

(22) Filed: Oct. 28, 2005

Related U.S. Application Data

(60) Provisional application No. 60/622,774, filed on Oct. 28, 2004.

(51) Int. Cl.
    *C02F 3/00* (2006.01)
(52) U.S. Cl. .................. 210/143; 210/85; 210/150; 210/220; 210/632
(58) Field of Classification Search ................ 210/606, 210/143, 85, 150, 220, 632
See application file for complete search history.

(56) References Cited

U.S. PATENT DOCUMENTS 5,482,630 A * 1/1996 Lee et al. .................. 210/605

\* cited by examiner

*Primary Examiner*—Chester T. Barry
(74) *Attorney, Agent, or Firm*—Head, Johnson & Kachigian

(57) ABSTRACT

A method of managing organic waste and an organic waste management system. The method includes the steps of receiving organic waste liquids and solids in a collection vessel, such as a grease trap. The dissolved oxygen is monitored, the pH level is monitored, the flow is monitored, and the temperate of the organic waste liquids and solids in the collection vessel are all monitored and data is generated therefrom. Enzymes and bacteria are generated/supplied and delivered along with other reagents to the collection vessel in response to the data. In addition, dissolved oxygen, air, or equivalent is applied to the collection vessel in response to the data so that the organic waste liquids and solids are degraded.

11 Claims, 22 Drawing Sheets

ORGANIC WASTE MANAGEMENT SYSTEM

CROSS-REFERENCE OF RELATED APPLICATION

This application claims priority to U.S. Provisional Application No. 60/622,774, filed Oct. 28, 2004 entitled "Floor, Surface, Drain and Site Waste Collection Management System".

BACKGROUND OF THE INVENTION

1. Field of the Invention

The present invention relates to a process and a system for managing both the liquidation and degradation of organic waste liquids and solids from a grease trap, interceptor, holding tank or similar vessel. Specifically, the present invention relates a coordinated treatment of waste including the addition of micro-organisms, enzymes and/or chemicals, along with oxygen/air to a grease trap or similar waste management apparatus, the monitoring of conditions and real time adjustment to both accommodate changing conditions of the waste being treated and to optimize the intended liquidation and degradation of the waste. The amount of fat, oil, grease and other waste build up is thereby reduced in order to increase the amount of waste that may be deposited into a municipal or similar waste or sewage system.

2. Prior Art

Restaurant kitchen and food service waste water contains fats, oils and grease. Because fats, oils and grease will coat, congeal and accumulate on pipes and pumps and sometimes obstruct sewer and waste water lines, restaurant and food service establishments are required by most local and other governments to install and maintain collection devices, sometimes known as grease traps or interceptors. If fats, oils and greases from restaurant and food service establishments are not properly managed, they can become a significant problem for waste water collection and treatment systems leading to costly and hazardous flow of waste, fat, oils and greases into drain lines, sewer lines, lift stations, drain fields and publicly owned treatment works. Improper disposal of fats, oils, and greases can result in high biochemcial oxygen demand (BOD) levels, increasing operating costs, clogging collection systems and the production of hazardous fumes. Accordingly, there are limits set by local governments and waste water treatment authorities on how much fat, oil and grease may be contained in waste water generated by food service establishments.

A grease trap or interceptor is a vessel designed to prevent grease, fat and oils, solids and other debris from entering the waste water stream.

In a typical interceptor or grease trap, oil and grease, which are lighter than water, float to the top of the collection vessel while solids drop to the bottom primarily based on the principles of Stoke's Law. Once these components have been given sufficient time to separate, an aqueous phase results between the floating oil and grease and the solids on the bottom of the collection vessel. Assuming that the aqueous solution is within the acceptable limit of fat, oil and grease, the remaining aqueous solution may be deposited into a waste water system.

Periodically, the floating fat, oil and grease and the solids accumulated at the base of the vessel must be removed from the grease trap to be disposed of or treated at a separate site. The process of periodically removing the accumulated materials is costly and time consuming. In addition, it is often difficult to properly regulate the grease trap and undesirable levels of fat, oil and grease may accidentally enter the municipalities waste treatment pipelines and system. This can result in damage to the pipelines and waste water treatment system and can result in costly funds to an operator.

In the past, various enzymes and other chemical agents have been applied or added to grease traps independent of each other in an effort to reduce the amount of fat, oil or grease that accumulates therein. It is difficult to accurately determine the amount of additives or oxygen to be applied to a grease trap to suitably solubalize and digest the organic waste. For example, if too large a quantity of enzymes and bacteria is added to the system, the production of solid sludge will be accelerated which requires more frequent cleaning of the vessel.

Additionally, pH levels outside certain ranges can cause advanced deterioration of gathering systems.

Air or oxygen have also been introduced into grease traps in the past, although typically this alone will not adequately digest the organic waste due to emulsification of the fat, oil and grease or other critical factors such as pH and temperate being out of optimum range.

Additionally, if the grease trap or interceptor is not properly maintained, it can emit unpleasant or hazardous odors.

According, there remains a need to provide an organic waste management process and organic waste management system which will effectively dissolve and degrade fats, oils and greases.

It is a principal object and purpose of the present invention to provide a method and system to effectively dissolve and digest fats, oils and greases as a part of a waste management system.

It is a further object and purpose of the present invention to monitor the levels of multiple parameters affecting the concentration of fats, oils and greases in the collection vessel.

It is a further object and purpose of the present invention to provide a system and method for adjusting the addition of enzymes and other additives based on conditions monitored within the collection vessel.

It is a further object and purpose of the present invention to provided a mechanism to remotely monitor various parameters affecting fats, oils and greases in the grease trap in a usable format for single or multiple sites, including use by regulatory authorities.

It is a further object and purpose of the present invention to optimize the environment through automated and periodic data analysis, often unique to a particular system.

SUMMARY OF THE INVENTION

The present invention is directed to both a process and a system for treatment of organic waste in the form of fats, oils and grease.

A grease trap, interceptor, or collection vessel receives organic waste liquids and solids which may originate from a restaurant, a food service, or food processing waste water stream. In the collection vessel, the organic waste will separate into solids at the base of a chamber and floating fat, oil and grease. An aqueous phase is located therebetween.

The present invention will electronically monitor the pH level, monitor the dissolved oxygen, monitor the flow, and monitor the temperature of the organic waste liquids and solids in the collection vessel at multiple points in the facility. The present invention will dynamically make real-time adjustments in order to balance and optimize the effective bacteria/enzyme activity in the collection vessel.

The vessel includes a sensor controller with a number of sensors. The sensors may be located beneath the level of the organic waste liquids and solids or, alternatively, the monitor containing the sensors may be located above the level of liquids and solids. The monitor includes a sensor to monitor the level of dissolved oxygen in the liquids and solids. Additionally, the monitor includes several devices to sense the temperature of the organic liquids and solids. Finally, the monitor includes several pH level sensors to determined the pH level. Each of the sensors generate signal information or data which is transmitted to a senor monitor for processing. The sensor monitor is, in turn, in communication with a system monitor controller or regulator.

The fermentation chamber or enzyme generator is regulated by the system monitor and a local sensor controller. Bacteria or other microorganisms are stored in a storage chamber and periodically released in metered dosages into the fermentation chamber or directly into the system. Additional storage chambers or tanks store protein, carbohydrates, buffers or other additives in order to release the additives into the fermentation chamber or directly into the system. The release of microorganisms and/or buffers from their respective storage chambers or reservoirs is regulated by the monitor controller. Additionally, the monitor controller regulates the amount of heat supplied to the fermentation tank.

When a level of dissolved oxygen is below the optimum for microorganism growth and digestion of fat, oils and greases in the collection vessel, the monitor controller will activate an air compressor and air jets to increase the dissolved oxygen level and/or dispense an oxidizing agent. Additionally, depending on the temperature of the organic waste liquids and solids in the vessel, cold water from a cold water source may be introduced into the vessel to lower the temperature.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
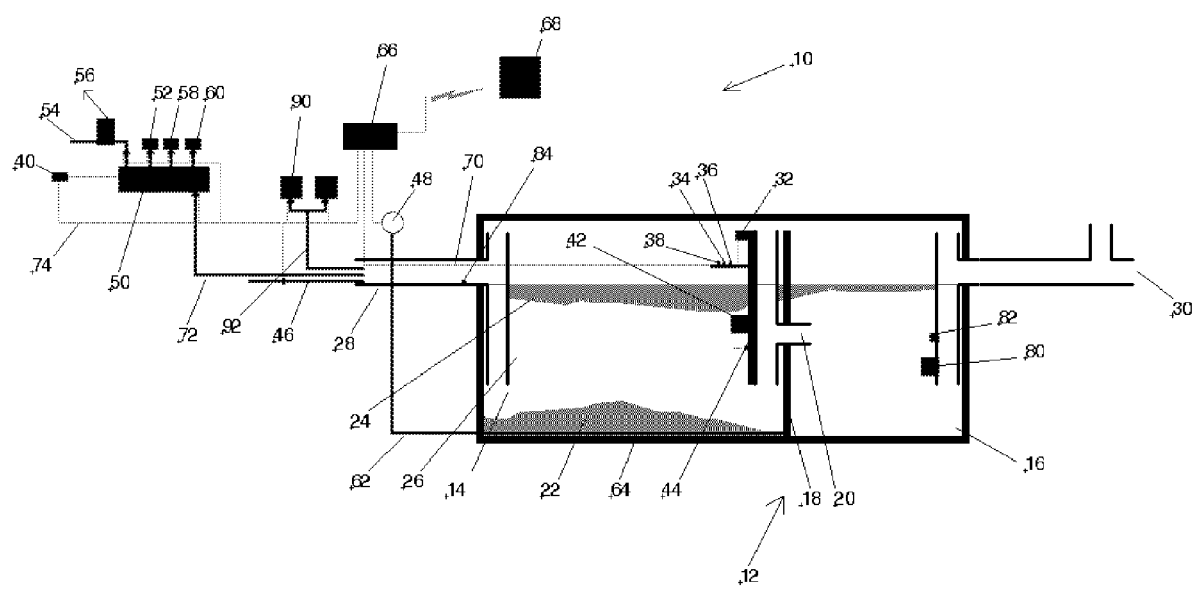
FIG. 1 is a simplified schematic diagram of an organic waste management system constructed in accordance with the present invention.

Referring to the drawings in detail, FIG. 1 illustrates a simplified, diagrammatic view of an organic waste management system 10 in a preferred embodiment.

A collection vessel 12 in the form of a grease trap or interceptor is shown. Organic wastes, such as fats, oils and grease, enter the vessel through an influent or inlet 28 which may originate from a restaurant or food service water waste stream. In one embodiment, organic waste liquids and solids are deposited in a first chamber 14 separated from a second chamber 16 by a baffle 18. A passageway 20 is positioned through the baffle 18 above the level of the floor of the first chamber 14. Accordingly, the organic waste will separate into solids 22 at the base of the first chamber 14. Floating fat oil and grease 24 and an aqueous phase 26 therebetween. The aqueous phase is permitted to move into the second chamber 16. Floating fat, oil and grease in the second chamber is blocked from passing to a discharge 30. As will be described herein, the aqueous discharge from discharge or effluent 30 will only contain fats, oils and grease within the amount permitted to be disposed of in a wastewater supply and within a regulated pH range.

It will be appreciated that the design of the vessel or grease trap may be modified or changed within the spirit and scope of the present invention.

The system of the present invention will electronically monitor the pH level, the dissolved oxygen, monitor the flow, and the temperature of the organic waste liquids and solids and dynamically make real-time adjustments to balance and optimize the effective bacteria/enzyme activity.

The vessel 12 includes a sensor controller monitor 32 with a number of discreet and distance sensors. The sensors may be located in the first chamber 14 beneath the level of the organic waste liquids and solids. Alternatively, the sensor monitor 32 containing the various sensors may be located above the level of liquids and solids in the first chamber 14.

The monitor 32 includes a sensor 34 to monitor the level of dissolved oxygen in the liquids and solids. Additionally, the monitor 32 includes a device 36 to sense the temperature of the organic waste liquids and solids. A temperature sensor 84 at the inlet 28 controls release of cold water into the vessel to optimize vessel temperature. Finally, the monitor 32 includes a pH level sensor 38 to determine the pH level. Each of the sensors 34, 36 and 38 generate information or data which is transmitted to the monitor 32.

A pH sensor 80 and a flow sensor 82 are located in the collection vessel near the discharge.

The sensor controller monitor 32 is in communication with a monitor controller or regulator 66. The sensor controller 40 sends a signal or signals concerning measurements to the monitor controller or regulator 66 via line 74.

In one configuration, the sensors 34, 36 and 38 are located above the level of the liquids and solids. Periodically, a pump 42 in connection with a tube 44 is activated so that liquids from the first chamber or other chambers are pumped through the tube 44 and past the sensors. Once data or readings have been gathered from the sensors, claim water from a water source, such as shown by line 46, may be provided to clean the tube and sensors prior to another reading. Accordingly, the sensors will not be encrusted or covered with solids or sludge which could interfere with proper readings.

For example, the pump 42 may be activated every five minutes for a 30 second interval so that readings are obtained every five minutes. Thereafter, water is delivered through the tube to clean it.

A fermentation chamber or enzyme generator 50 is regulated by the sensor controller 40. Bacteria or other microorganisms are sorted in a storage chamber 52 and periodically released in metered doses into the fermentation chamber 50. The controller 40 may include a central processing unit that processes data from the sensors. The release of microorganisms and/or buffers from their respective storage chambers or reservoirs into the enzyme generator 50 is regulated by the controller 40. The controller 40 also regulates the amount of heat supplied to the fermentation tank. In order to increase the temperature, a cold water source shown by line 54 and water heater 56 are provided to deliver hot water to the enzyme generator 50. The controller may follow a pre-programmed procedure for allowing microorganisms to multiply in the enzyme generator and then be released into the vessel 12. The controller adjusts this procedure in response to readings from the sensors. For example, if the monitor detects that the pH level is outside the optimum range for the growth and digestion of the fats, oils and greases by the microorganisms, the controller may increase or decrease the amount of buffer added in order to compensate. The bacteria 52 may fall by gravity into the fermentation chamber or may be pumped thereto.

When a level of dissolved oxygen is below the optimum for microorganism growth and digestion of fats, oil, and greases, the controller will activate the air compressor and air jets to increase the dissolved oxygen level.

Additional storage chambers or tanks 58 and 60 store protein, carbohydrates, buffers or other additives to release the additives into the fermentation chamber. For example, bacteria or other microorganisms would be periodically released from the storage chamber 52 into the fermentation chamber 50. The release of enzymes from the enzyme generator 50 is controlled by the regulator 40 in response to data from the sensors.

Direct to vessel reagent tanks 90 permit direct release of additives to the vessel via line 92 as determined by the monitor controller 66.

Depending on the data and information gathered from the sensor 32, 34 and 36, the enzyme generator 50 may be operated to release enzymes through line 72 into the vessel 12. Additionally, depending on the temperature of the organic waste liquids and solids in the vessel, cold water from a cold water source 46 may be introduced into the vessel to lower the temperature. Finally, air compressor 48 in combination with the lines 62 and air jets 64 introduce air or dissolved oxygen in response to instructions from the monitor controller 66.

All of the data gathered from the sensors 34, 36 and 38 can also be electronically delivered to a monitor controller 66 via 70. The controller 66 may include a central processing unit to process the data received from the sensor controllers 40 and 32 and the sensors. The controller 66 may also communicate with a remote data collector 68 in either wired or wireless fashion. Accordingly, the monitor/controller 66 and the remote data collector provide a mechanism for external, unidirectional or bidirectional communications concerning the status of the vessel or grease trap. For example, a restaurant chain could monitor and control the grease traps from each of its locations. Additionally, real time alerts could be generated at remote locations.

The system of the present invention reduces biochemcial oxygen demand on waste water treatment facilities downstream since the organic waste is not released until digested and processed.

In field tests of the present system, readings were gathered every few minutes which support the claims herein, including BOD levels, oil and grease levels, and total suspended solids (TSS), pH levels, and temperature.

Figure 2:
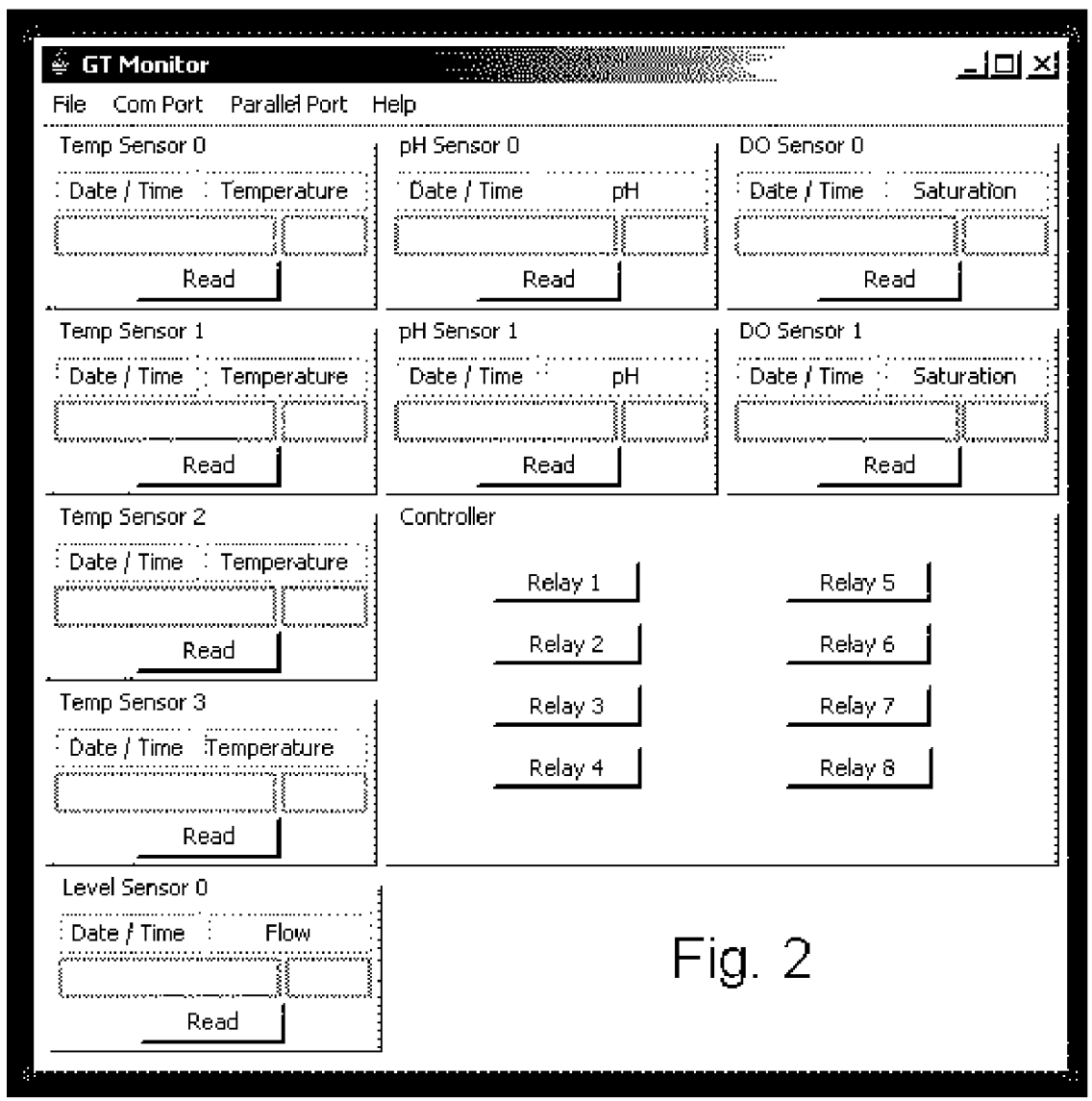
FIG. 2 is a screen display of the monitor controller of the present invention.

FIG. 2 illustrates a screen display of the monitor controller 66. Software is provided to control and automate functionality. Commands are issued to a sensor controller to provide readings or calibrate a probe. On/Off commands are sent to a relay controller to control high current devices.

Four temperature ports are available to make temperate measurements. Two pH ports are available for pH measurements and two DO ports are available to measure dissolved oxygen. These measurements can be made manually by depressing the appropriate button. The readings are displayed along with the date and time the reading was made. Every time a reading is made, an entry is made in a log and the data transmitted to a remote server that stores the data in a database. An archive feature allows the log with 24 hours of readings to be archived locally and sent to a remote server.

The relay controller controls eight relays. Relay "1" controls a sample pump in the main tank. Relay "2" controls a sample pump that is located in the discharge of the grease trap. Relay "3" and "4" control solenoids to dispense clean water. Relay "5" controls an air compressor that feeds diffusers in the grease trap and operates a solenoid that releases bacteria into the grease trap. These relays can be activated manually by depressing the appropriate button.

Two functions are automated. Relay "5" is activate once every 24 hours. Measurements are controlled at user selectable intervals. Relay "1" is turned on and tempsensor0, pHsensor0, and DOSensor0 are read. Then Relay "1" is turned off and Relay "3" is turned on to wash the probes. Next Relay "3" is turned off and Relay "2" it turned on and then tempsensor1, pHSensor1, and DOSensor1 are read. Then relay "2" is turned off and Relay "3" is turned on to clean the sensors. TempSensor2 (incoming solution) and tempSensor3 (ambient air) are read. After cleaning, Relay "4" is turned off and the process waits until the next measurement interval.

FIGS. 3 through 7 illustrate schematic diagrams of the sensors of the present invention.

Figure 3:
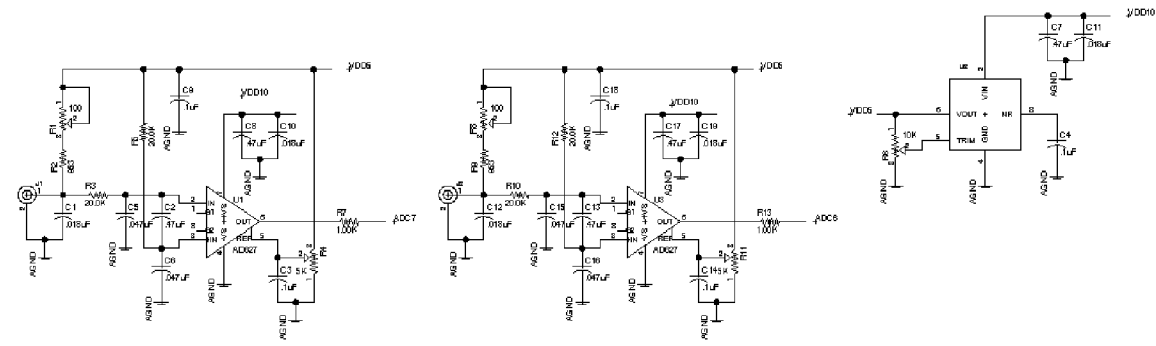
FIGS. 3 through 7 illustrate schematic diagrams of the sensors and sensor controllers of the present invention.
Figure 3:
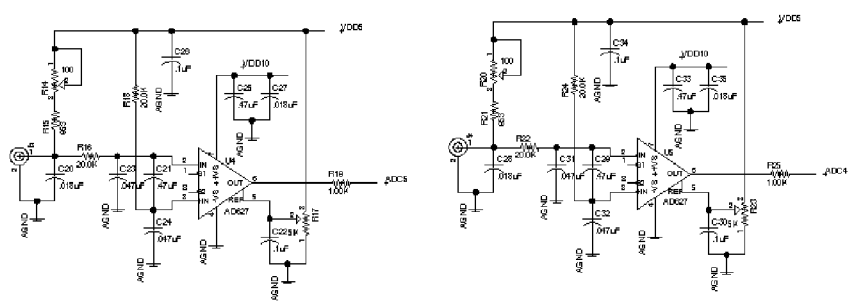
Figure 4:
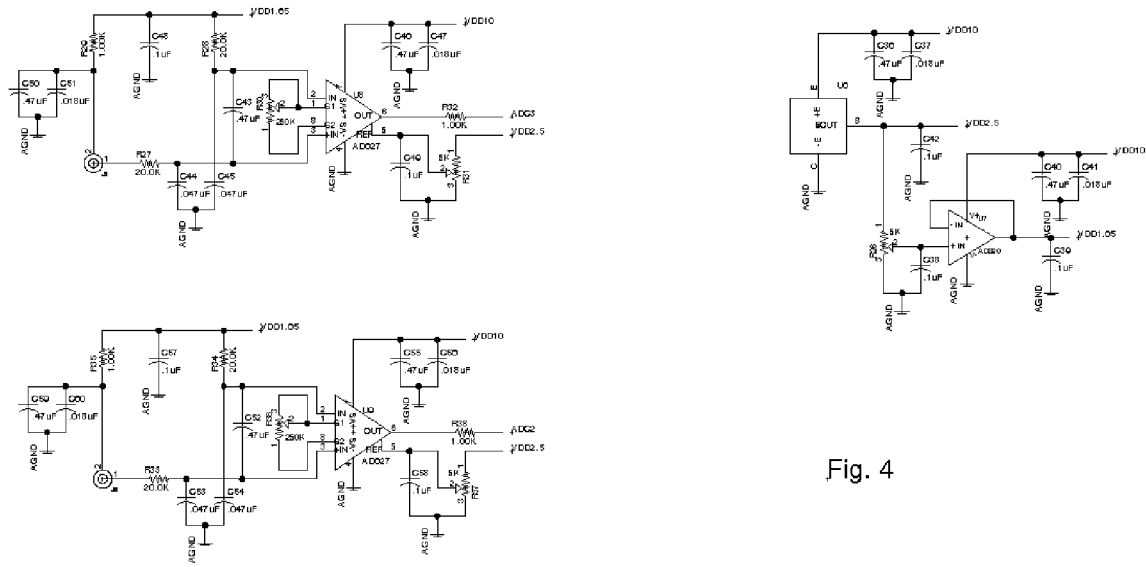
Figure 5:
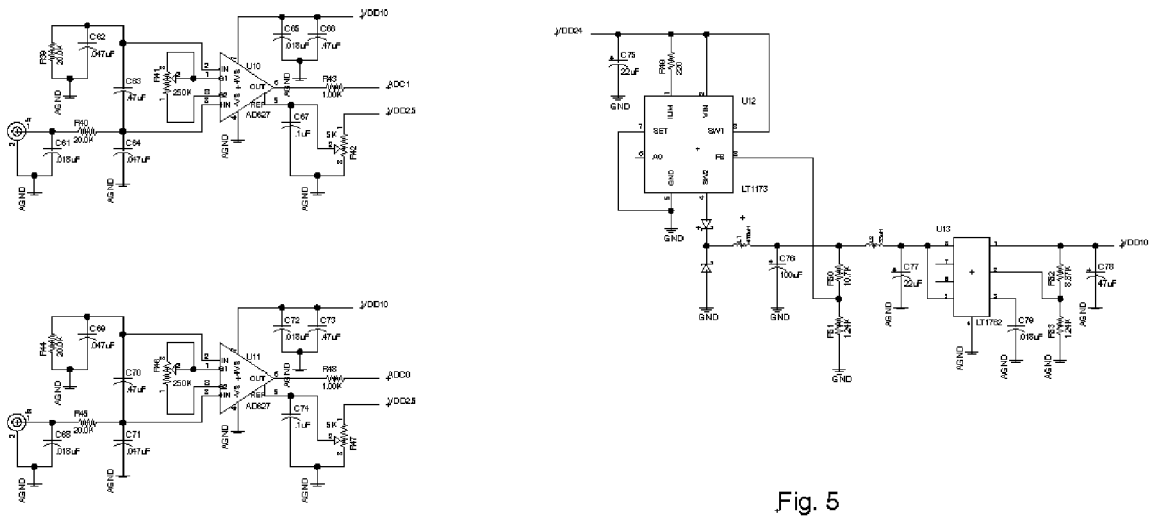

FIG. 3—Process temperature

The current from the temperature probes is converted into a voltage.

FIG. 4—Process pH

The voltage from the pH probes is buffered and amplified.

FIG. 5—Process DO

The voltage from the DO probes is buffered and amplified.

Figure 6:
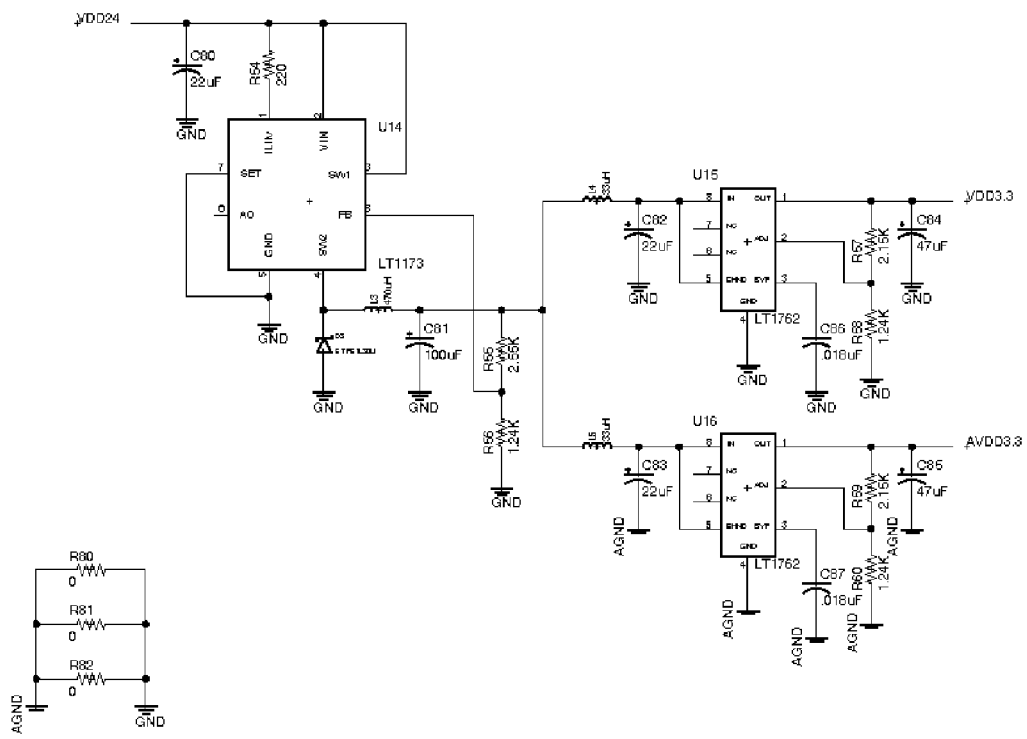
Figure 7:
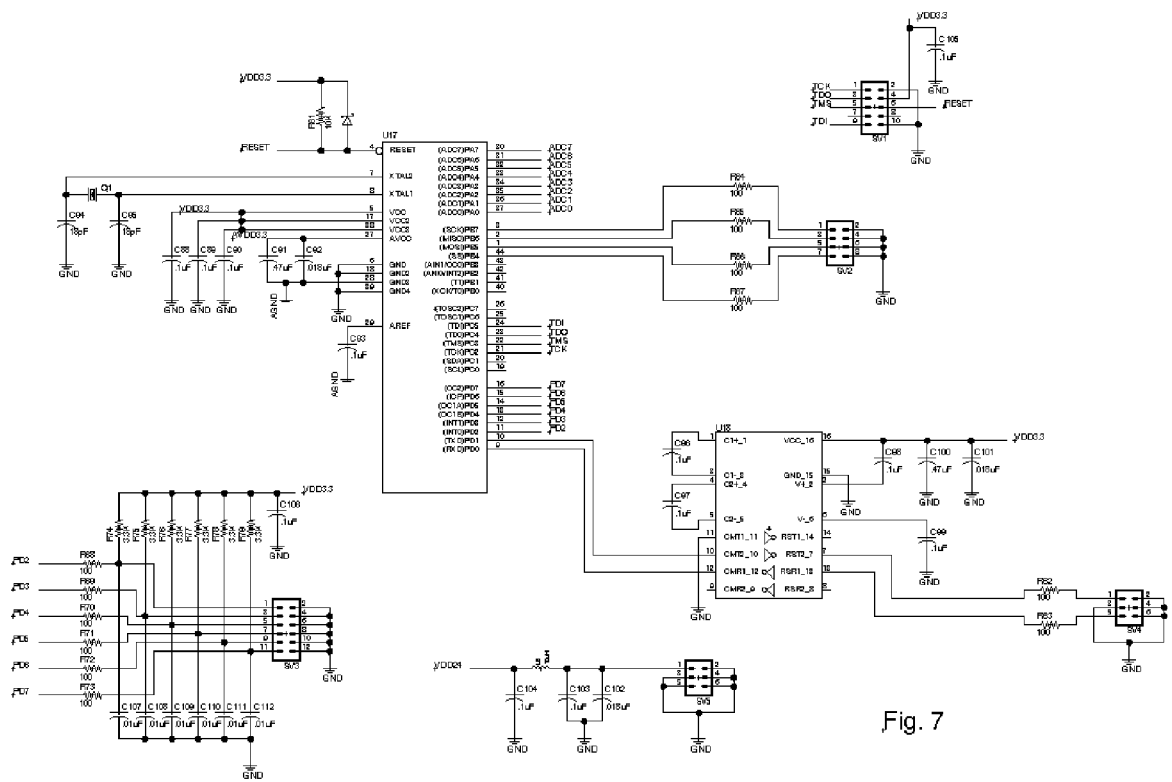

FIG. 6—Power Supply

The incoming 24 volts is converted into a digital 3.3 Volts and an analog 3.3 Volts.

FIG. 7—Control

All analog voltages are converted to digital, processed and sent to the monitor controller.

Figure 8:
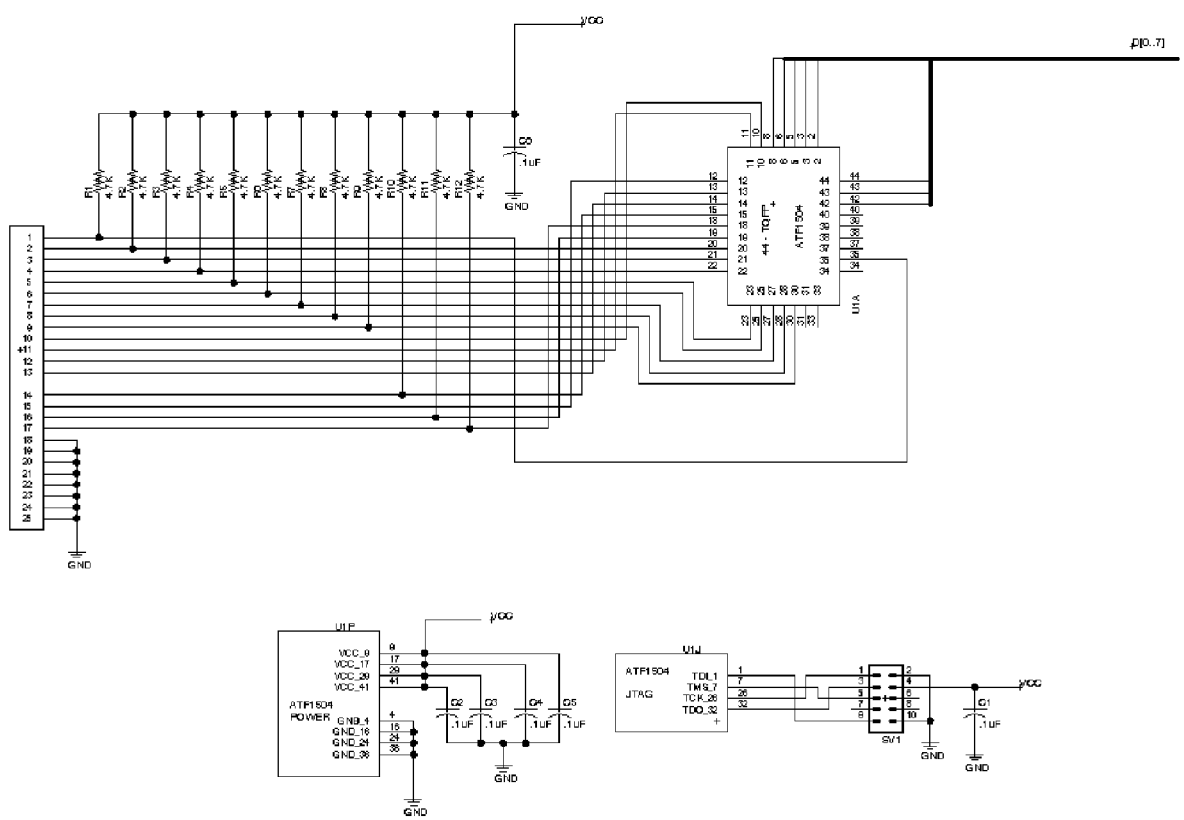
FIGS. 8 through 10 illustrate a parallel interface controller for an external central processing unit.
Figure 9:
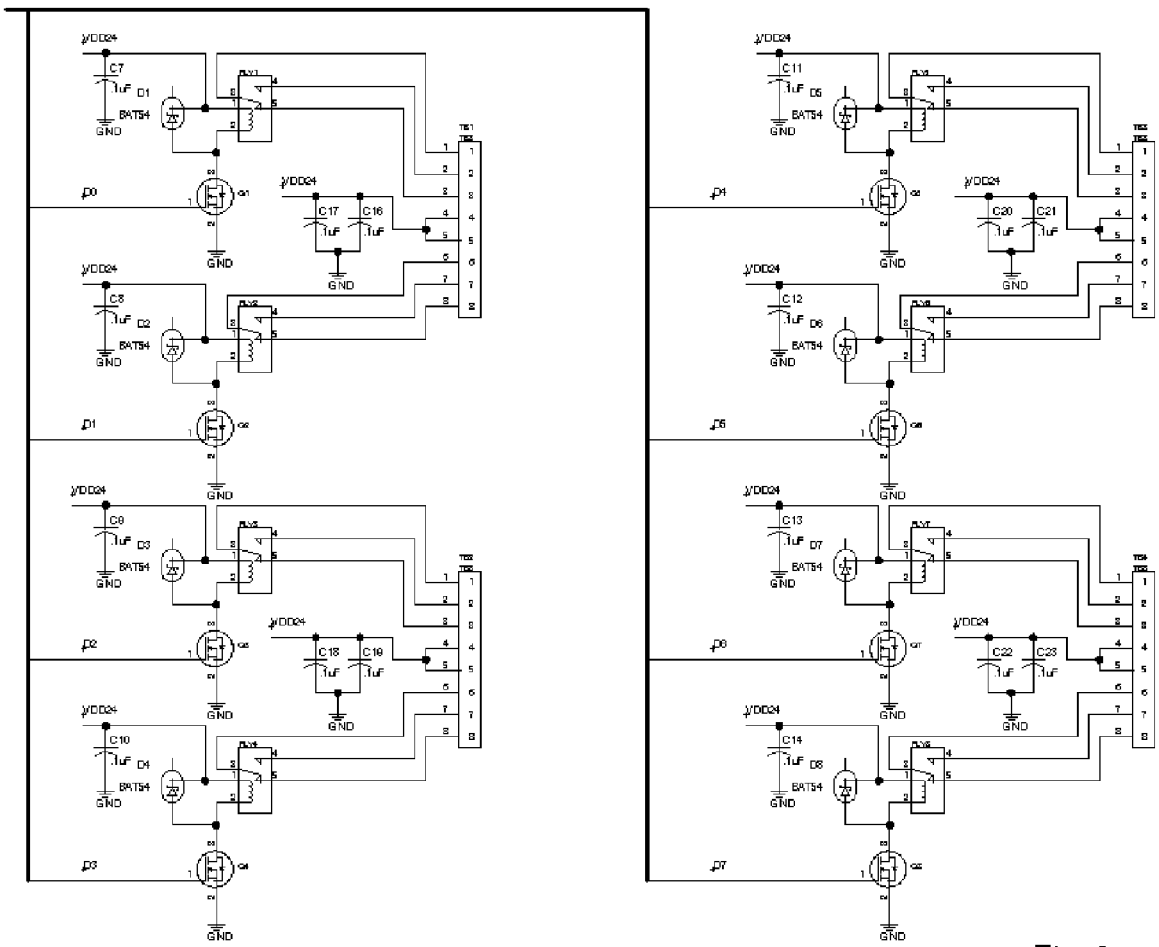
Figure 10:
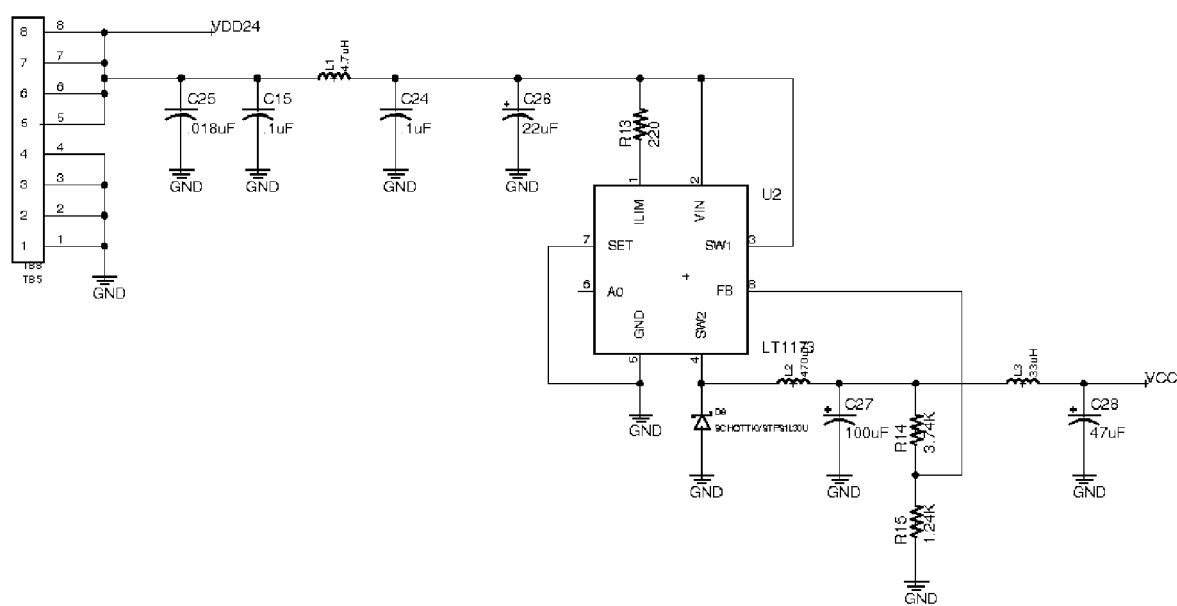
Figure 11:
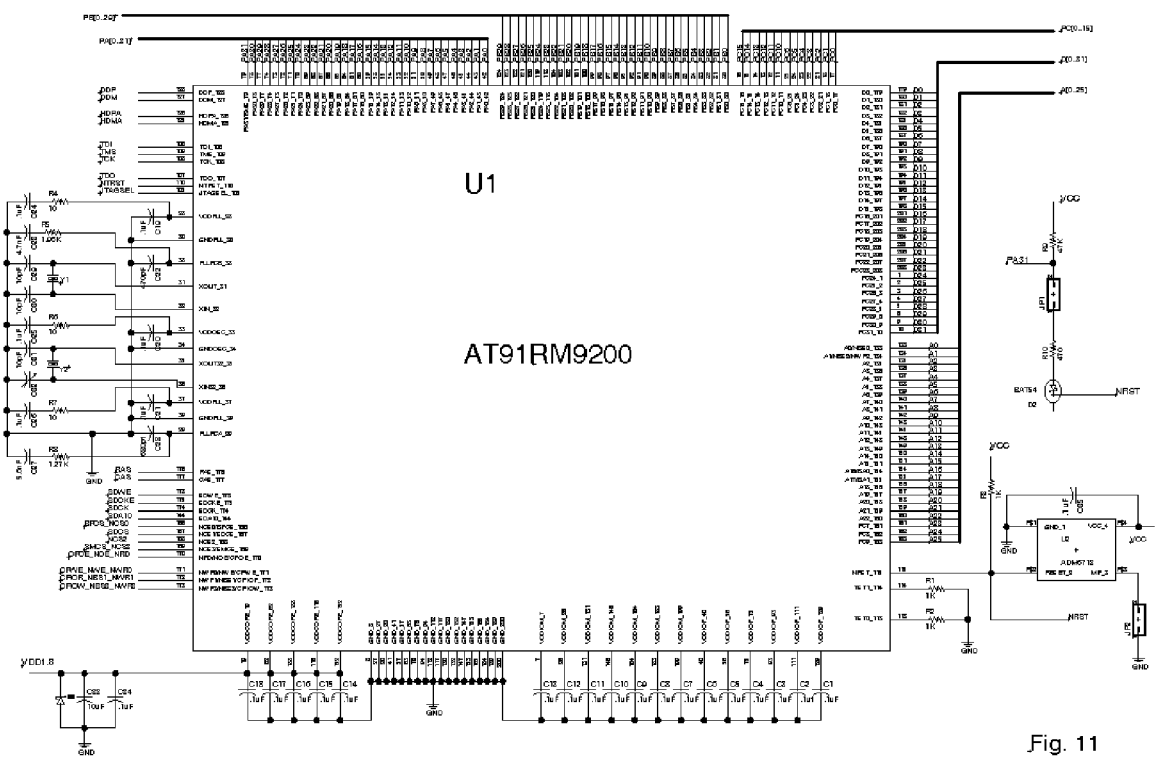
FIGS. 11 through 28 illustrate schematic diagrams of a monitor controller.

FIGS. 8 through 10 illustrate a parallel interface controller for an external central processing unit.

FIG. 8—Interface

Provides standard parallel port interface to computer and provides control signals to relays.

FIG. 9—Relay Interface

Signals from the interface are buffered to activate a relay that provides contact closures for control.

FIG. 10—Power Supply

The 24 volt input voltage is converted into 5 volts for VCC.

FIGS. 11 through 28 illustrate schematic diagrams of a monitor controller 66.

FIG. 11—CPU

The main ARM CPU.

Figure 12:
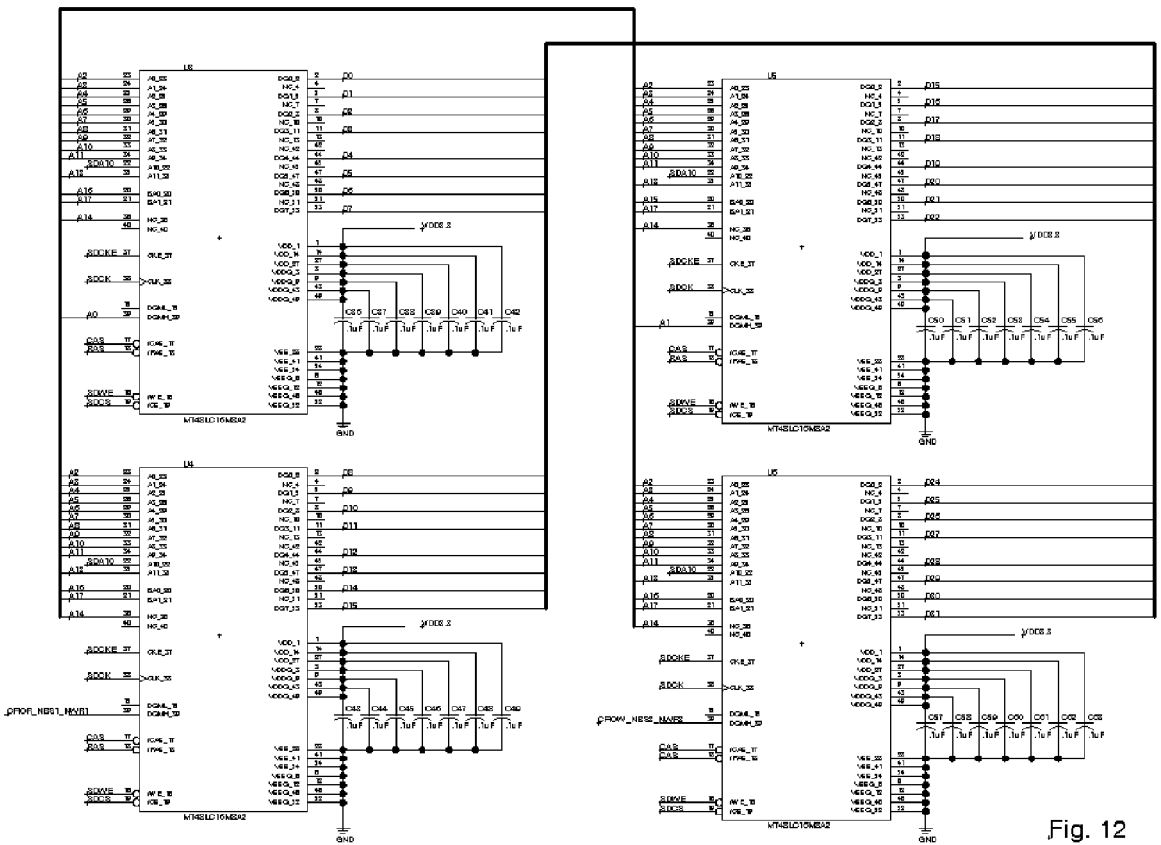

FIG. 12—Dynamic RAM

System random access memory

Figure 13:
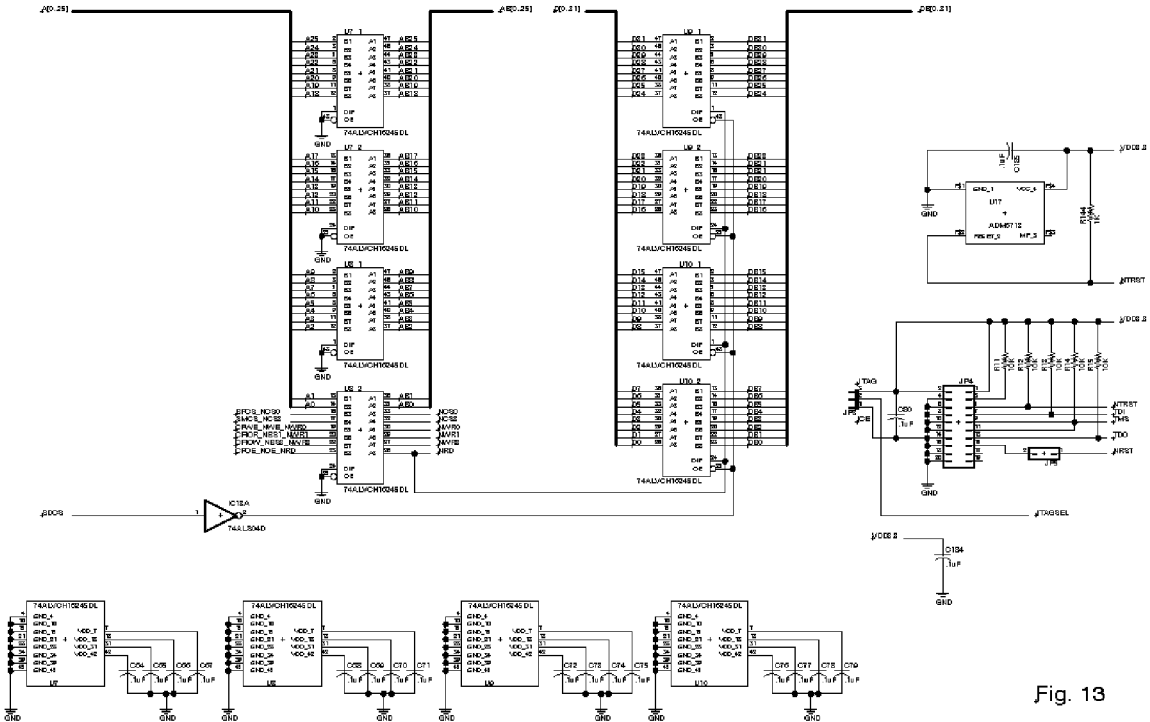
Figure 14:
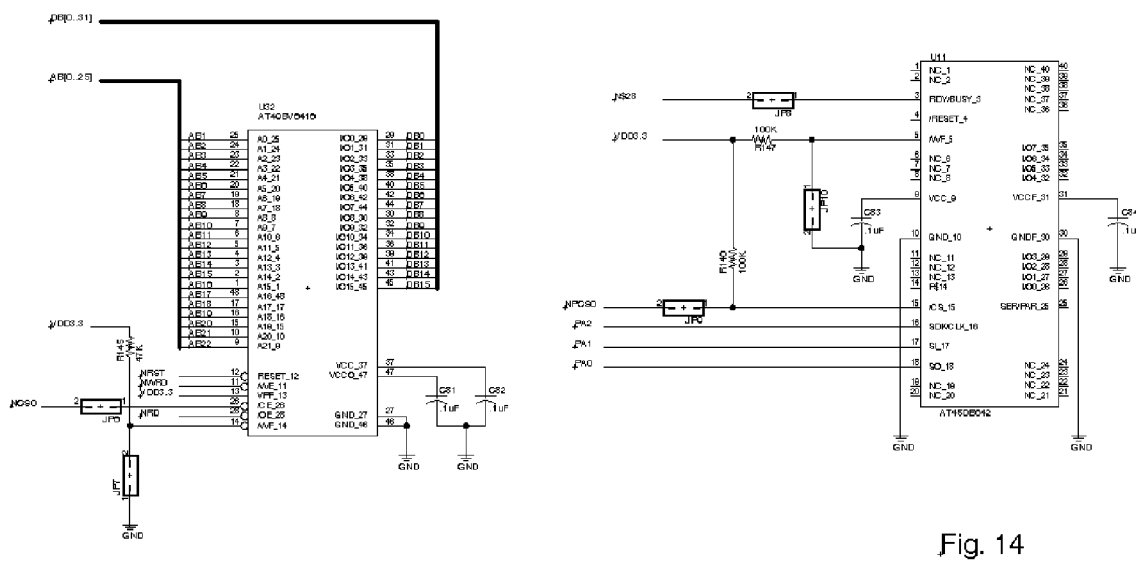

FIG. 13—Buss Buffers

Address and Data buffers to drive and receive from all peripherals.

FIG. 14—Flash

Parallel and serial flash for system and user non-voltage storage.

Figure 15:
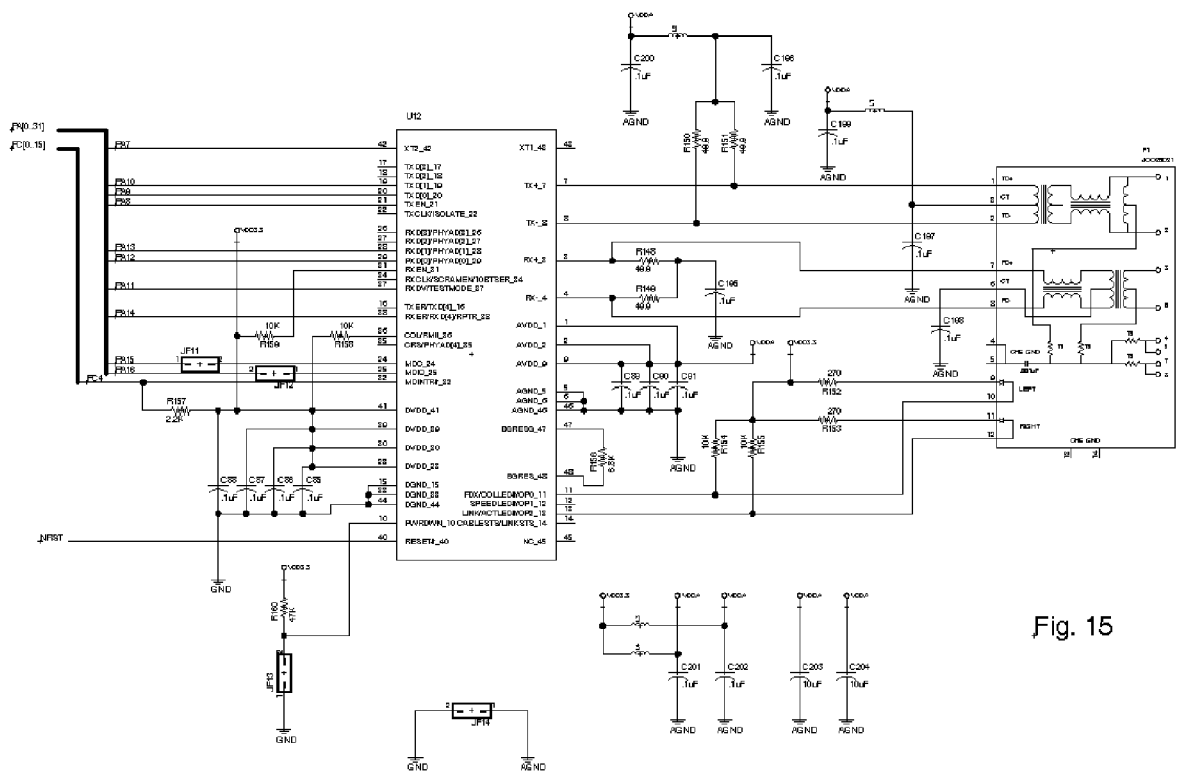

FIG. 15—Ethernet Interface

10/100 megabit network interface.

Figure 16:
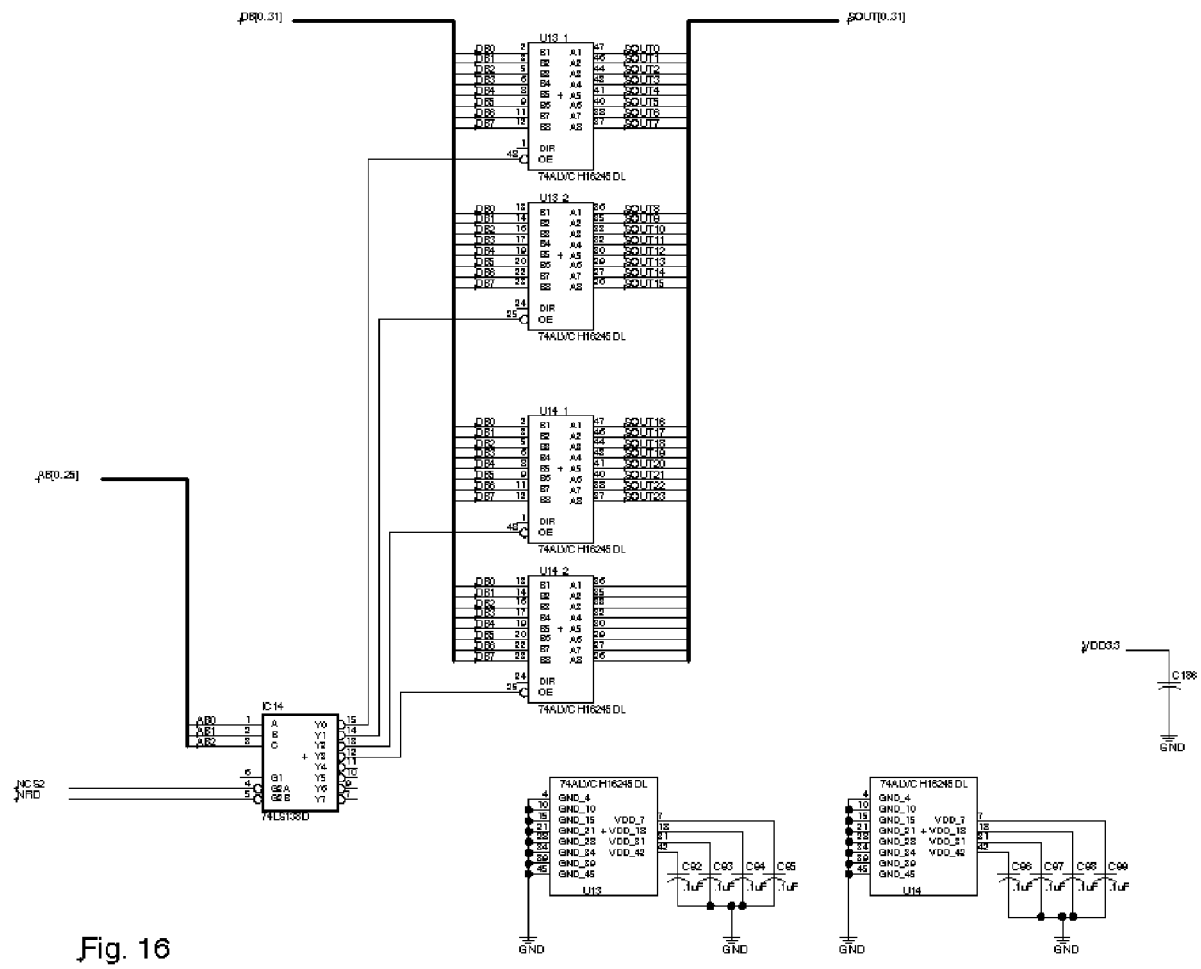

FIG. 16—Input Buss Buffers

The Input Buss Buffers apply the input signal to the processor data buss when the CPU requests input.

Figure 17:
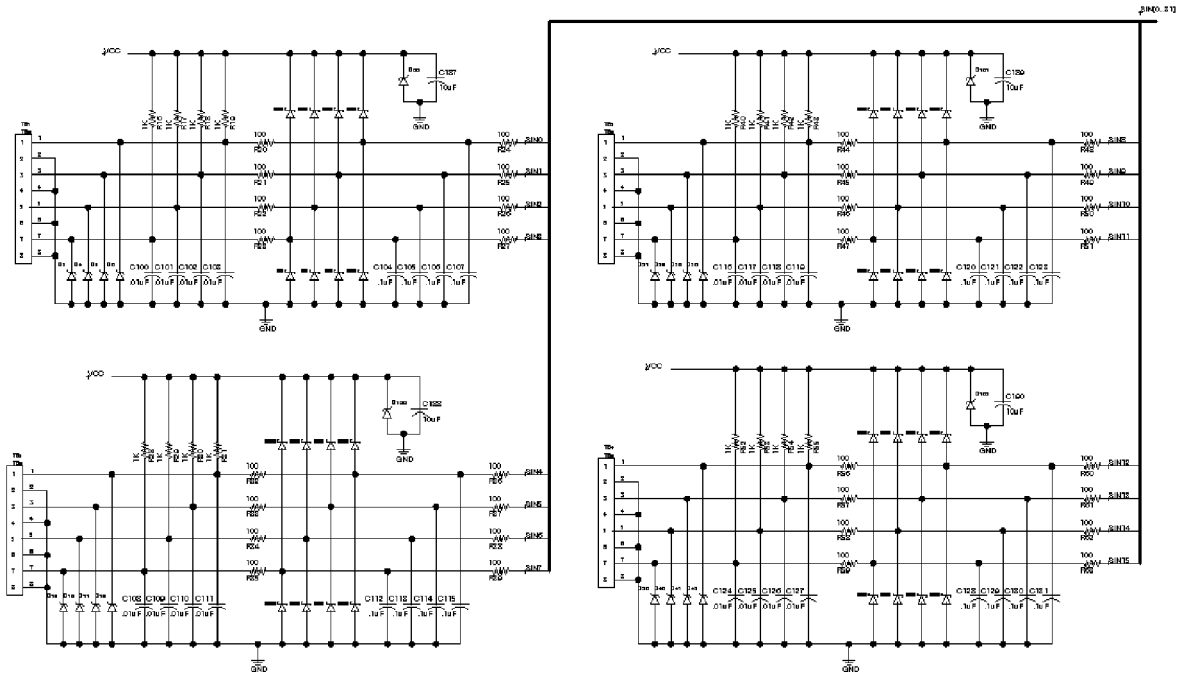
Figure 18:
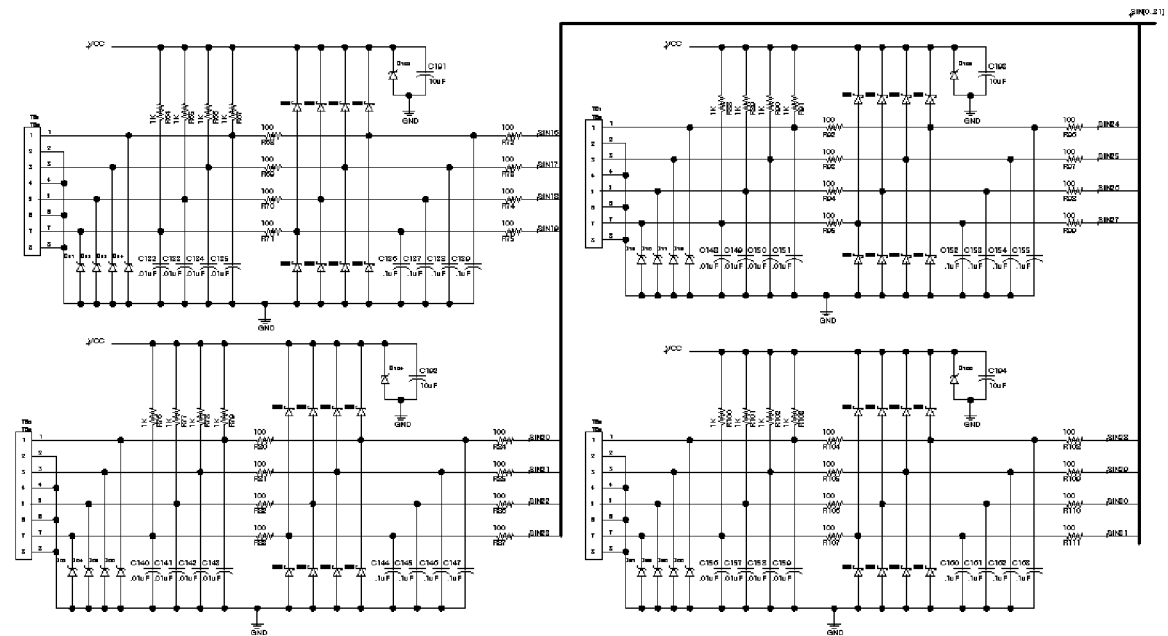

FIGS. 17 and 18—Digital Inputs

Digital inputs to sense external contact closures.

Figure 19:
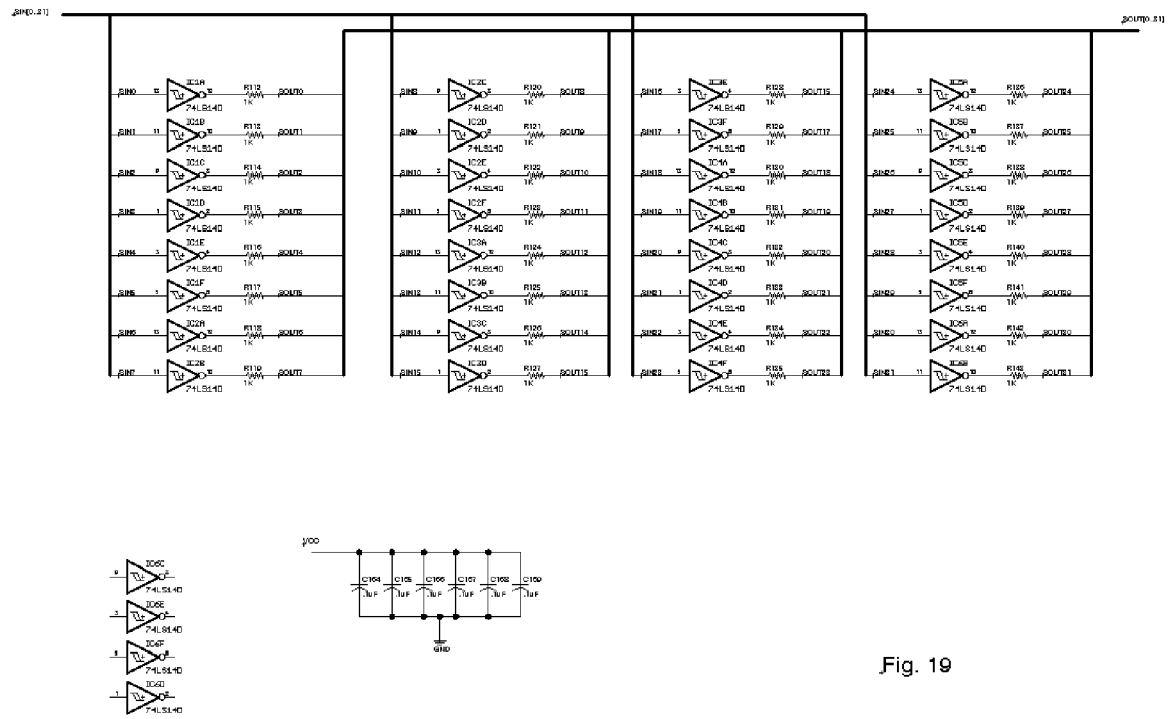

FIG. 19—Digital Input Buffers

Buffers to provide noise immunity for the digital inputs.

Figure 20:
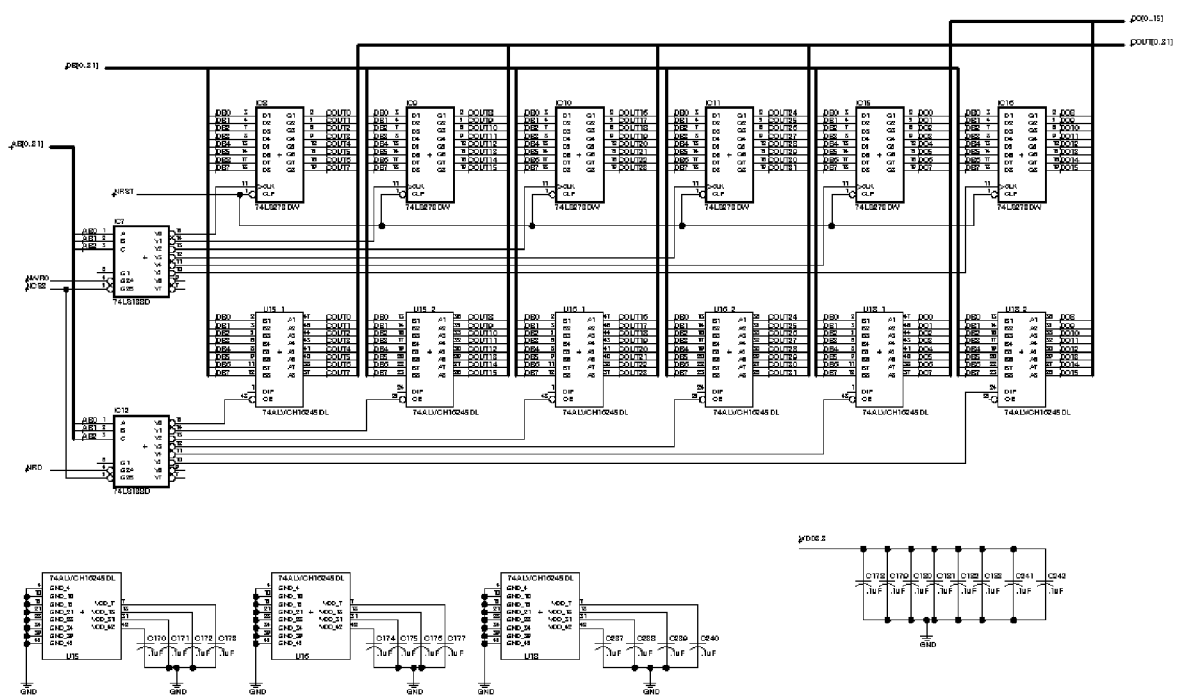

FIG. 20—Output Latches

These latches provide control signals to the relays.

Figure 21:
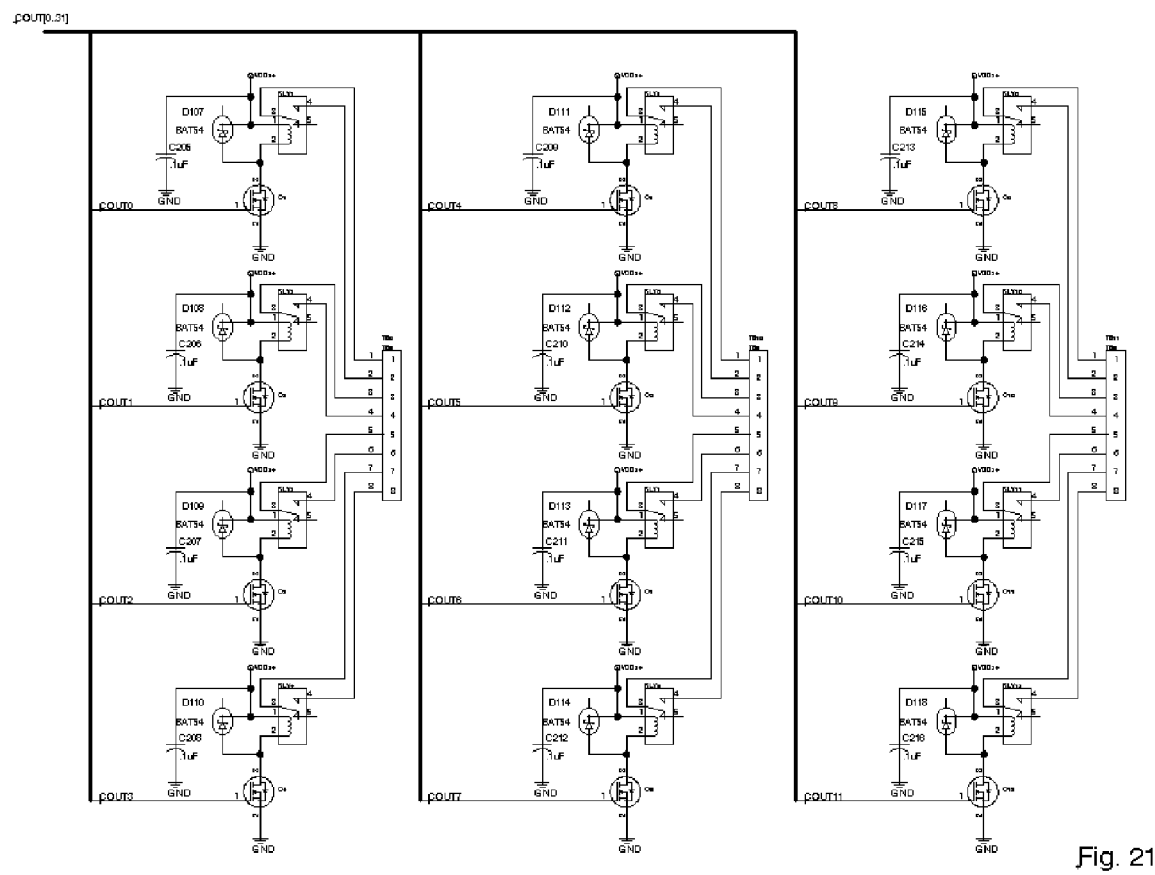
Figure 22:
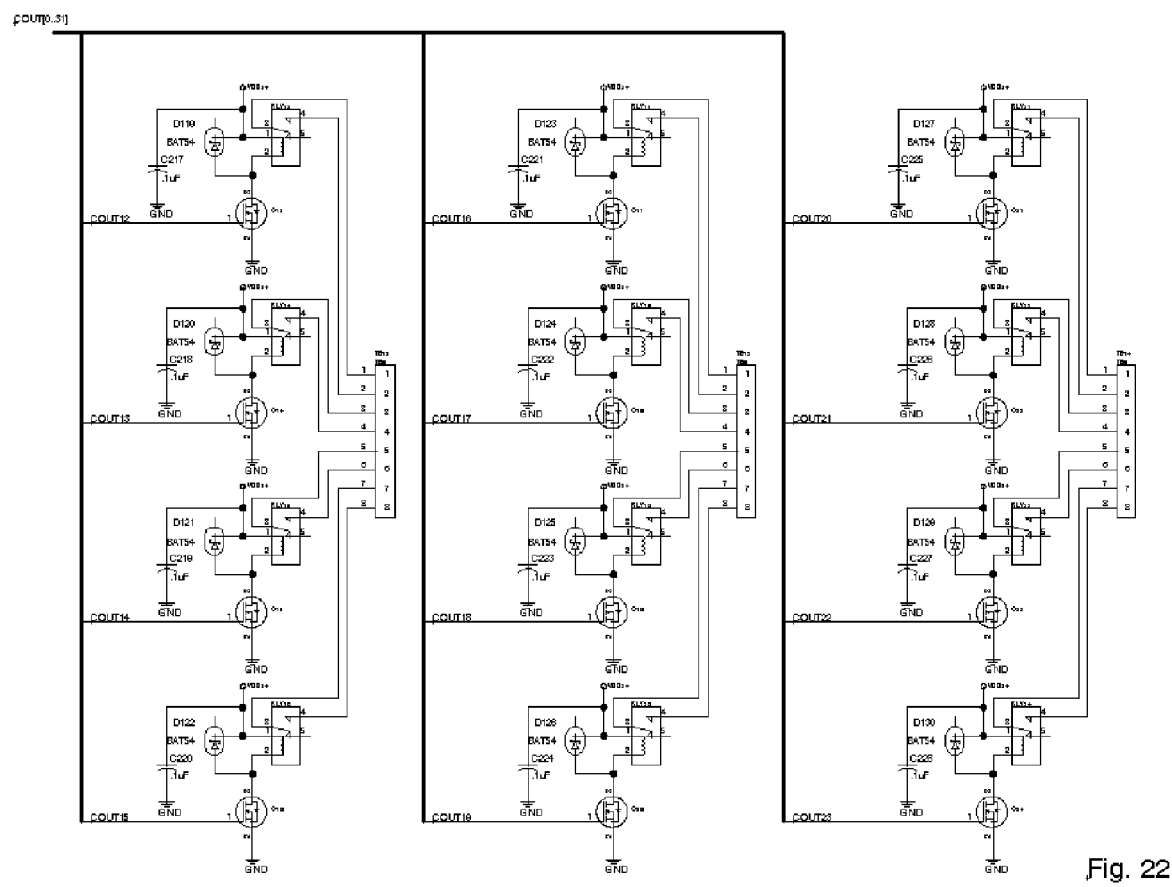
Figure 23:
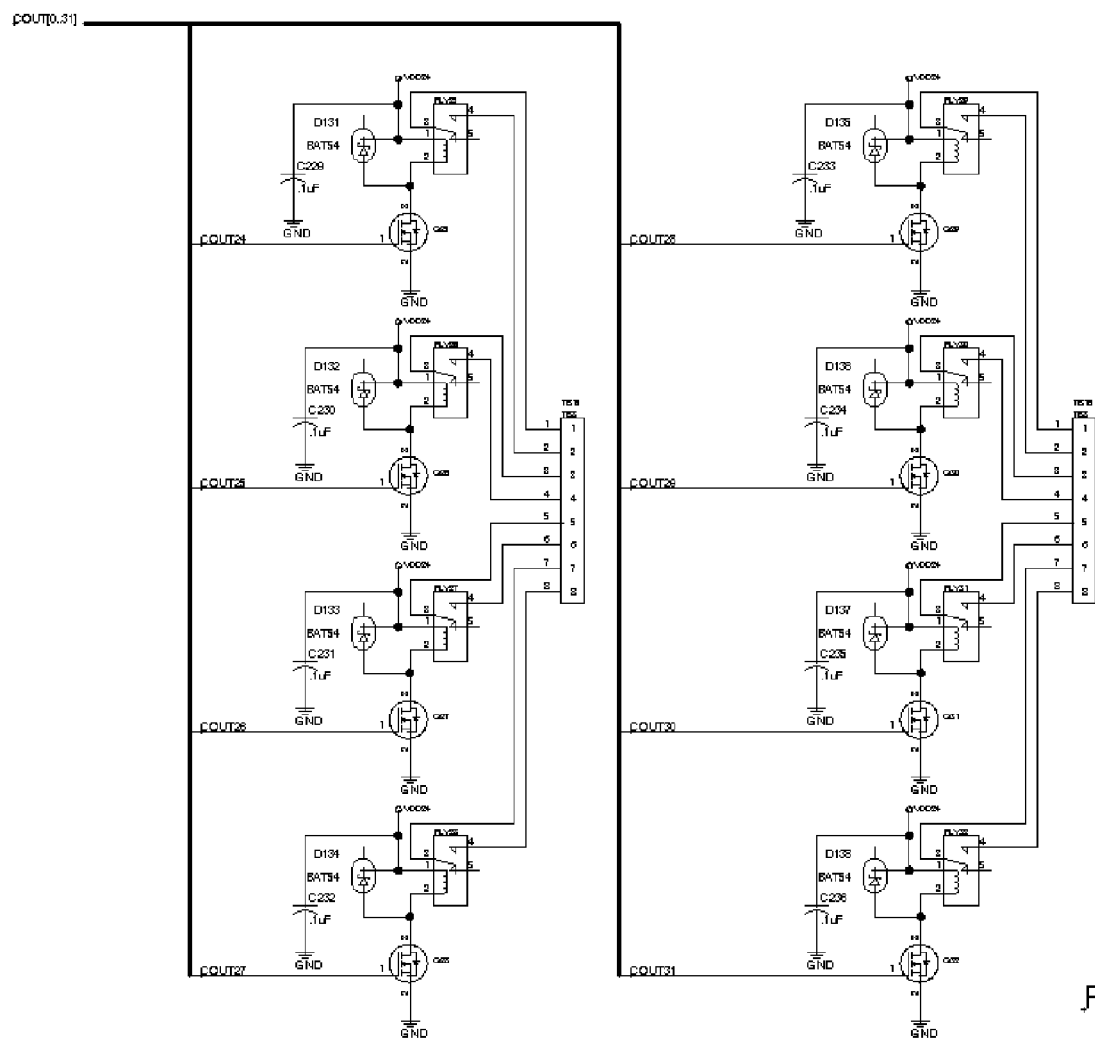

FIGS. 21 through 23—Relays

Drivers control the relays based on the input signals from the latches.

Figure 24:
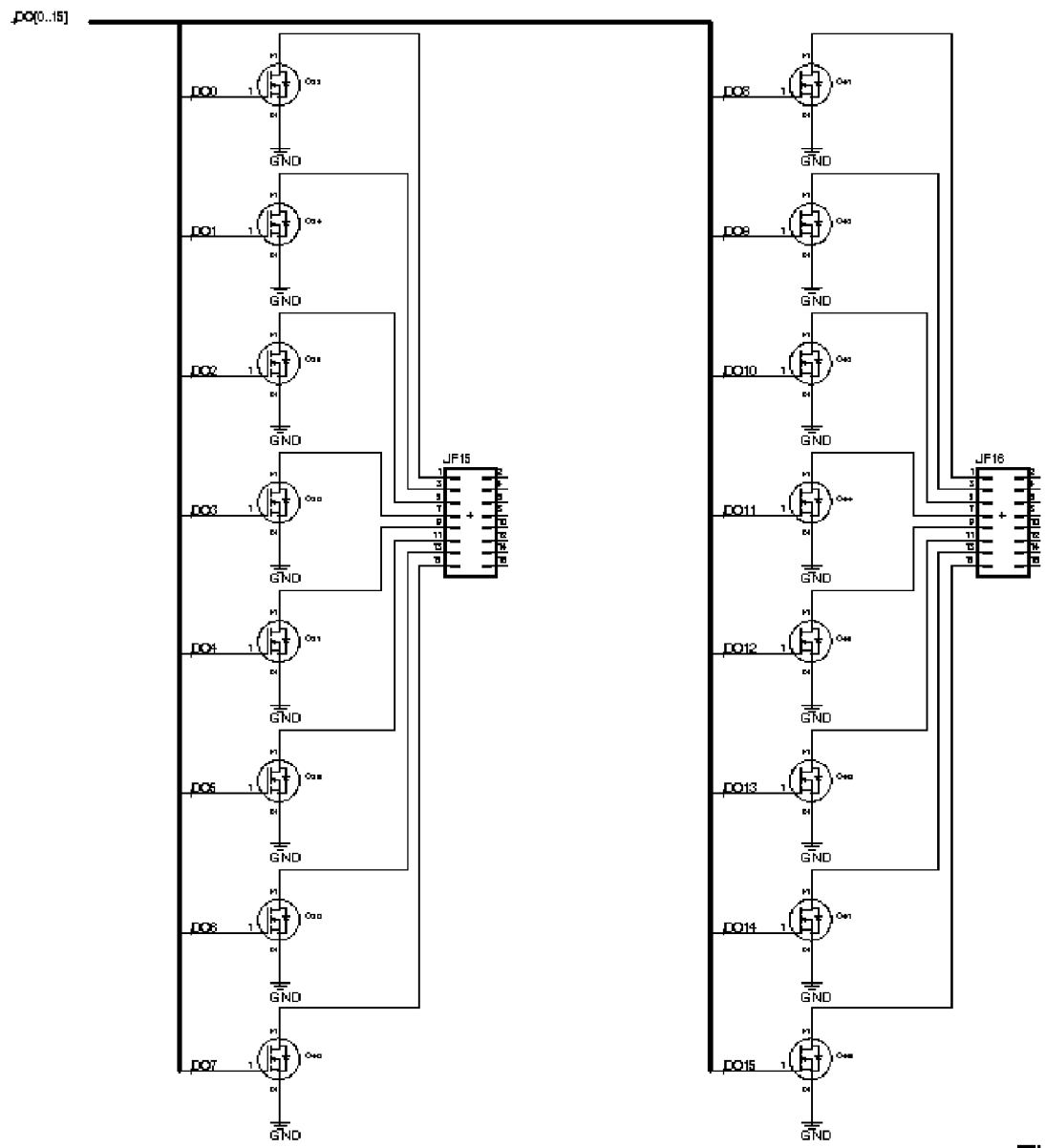

FIG. 24—Open Drain Outputs

The FET provides moderate current output control.

Figure 25:
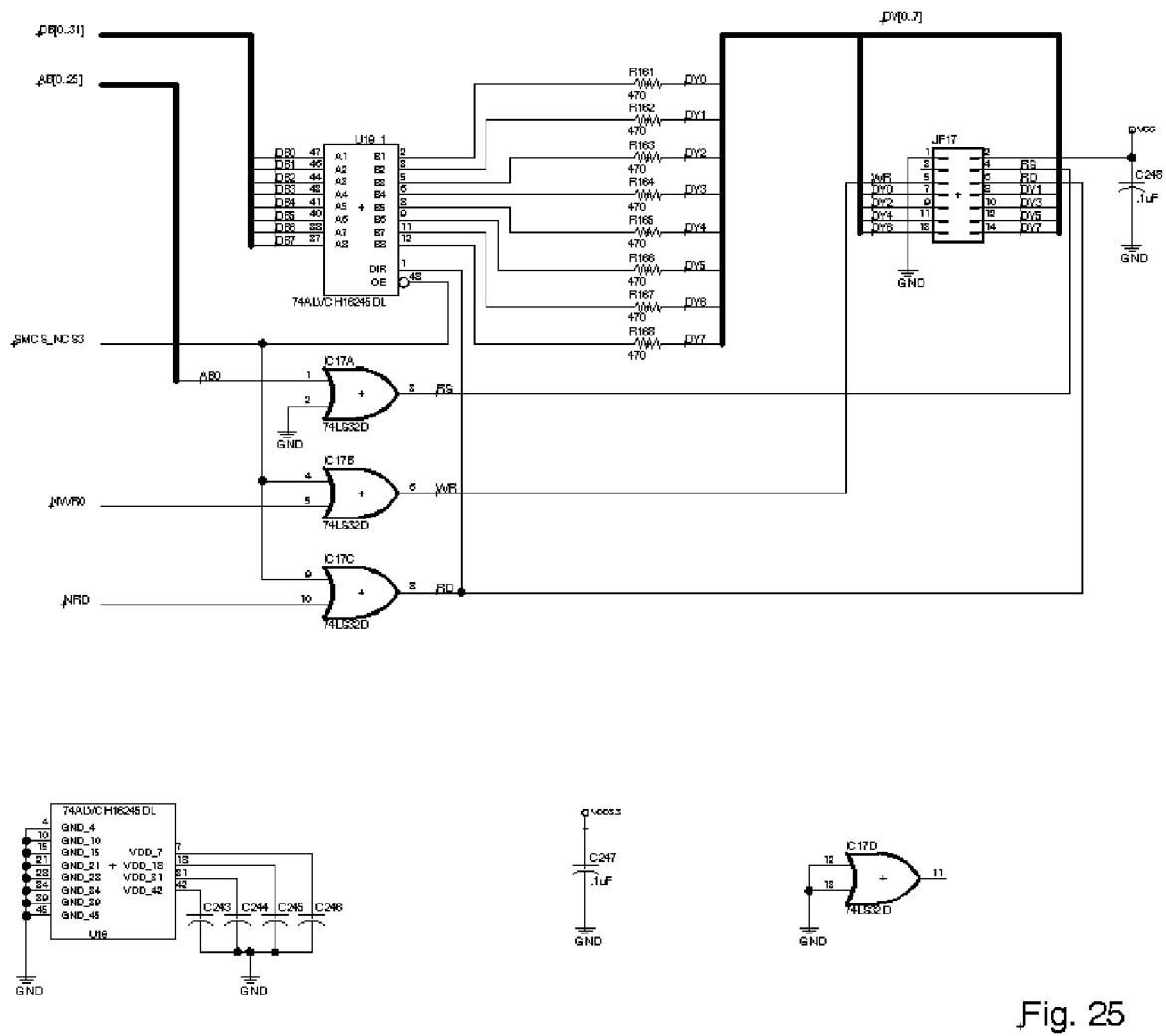

FIG. 25—Display Interface

Interface for DOT matrix display.

Figure 26:
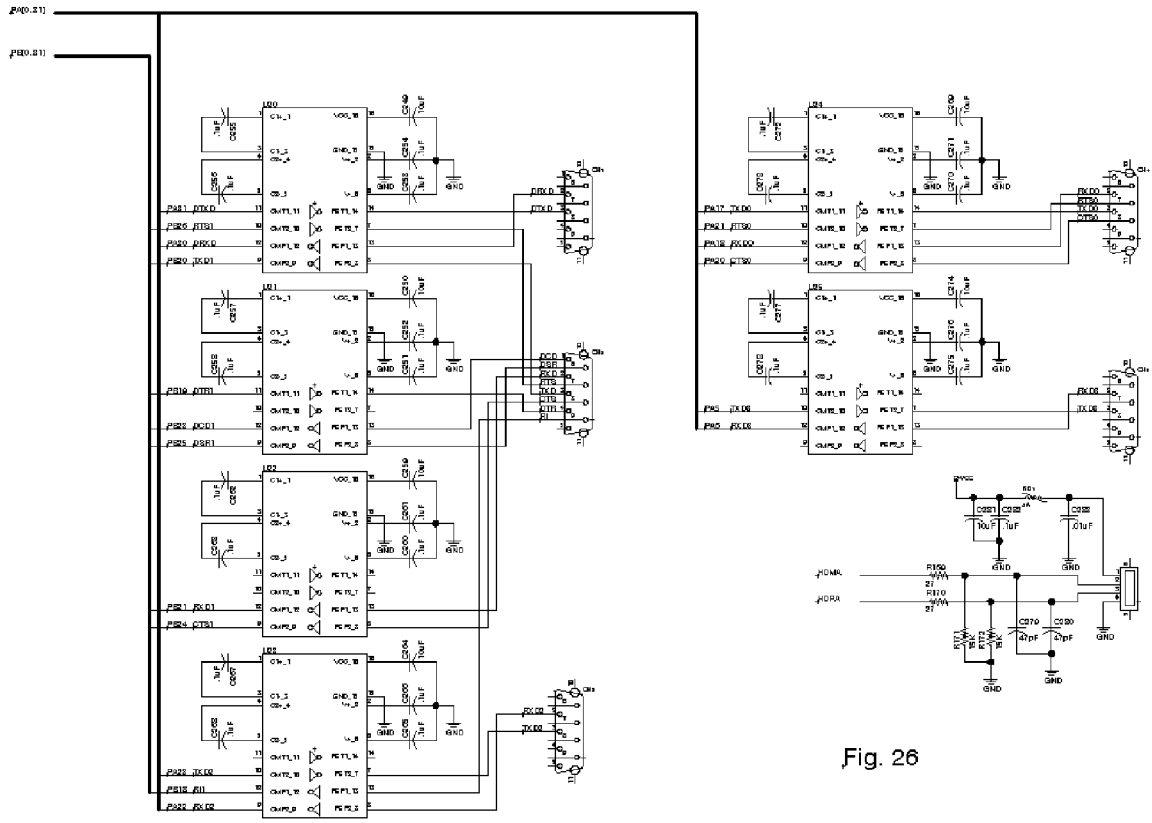

FIG. 26—Serial Communications

These interfaces provide serial communications for the Sensor controller, wireless communications, and Console.

Figure 27:
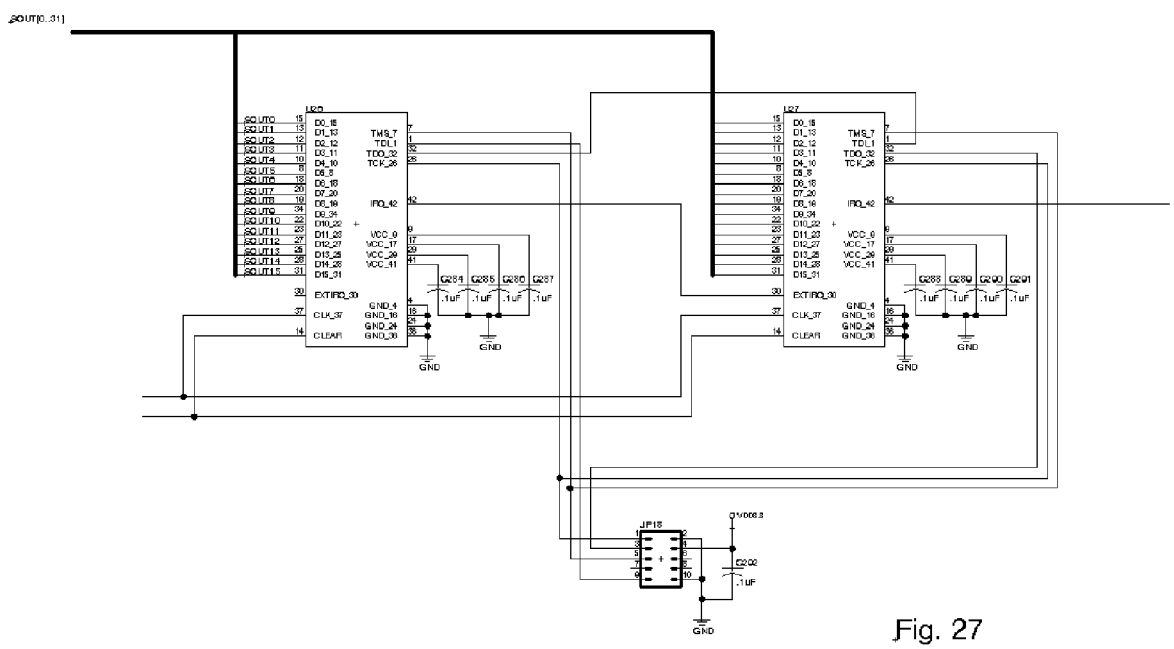

FIG. 27—Interrupt Controller

The interrupt controller provides an interrupt to the CPU when there is a change on the digital inputs.

Figure 28:
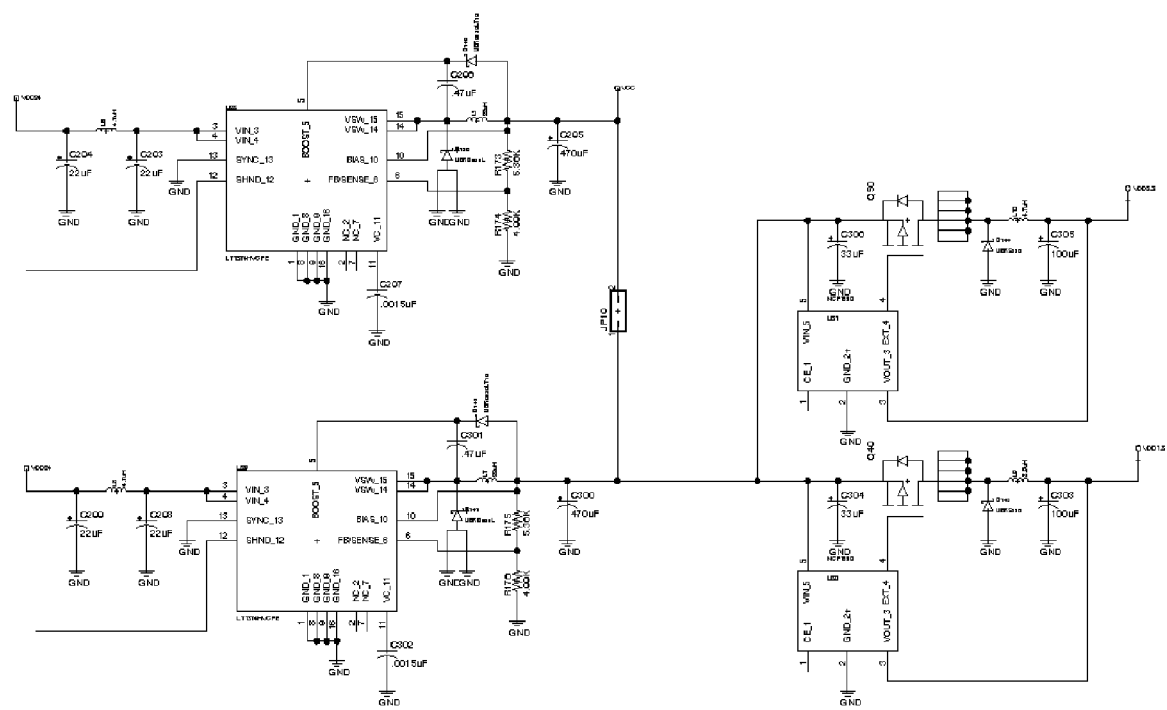

FIG. 28—Power Supply

The power supply provides +5 volts, one 3.3 volts for the CPU, and one 3.3 volt output for peripherals.

Whereas, the present invention has been described in relation to the drawings attached hereto, it should be understood that other and further modifications, apart from those shown or suggested herein, may be made within the spirit and scope of this invention.

What is claimed is:

1. An organic waste management system which comprises:
   a collection vessel for receipt of fat, oil or grease;
   a monitor to monitor dissolved oxygen, monitor the pH level, and monitor the temperature of said fat, oil or grease in the collection vessel and generate data therefrom;
   a fermentation chamber to generate enzymes separate from said vessel;
   a regulator receiving said data from said monitor;
   a delivery system to deliver said enzymes from said fermentation chamber to said vessel in response to said data; and
   a mechanism to apply oxygen or air to said vessel in response to said data wherein said system operates to degrade said fat, oil or grease.

2. An organic waste management system as set forth in claim 1 wherein said monitor is located outside said liquids and solids in said vessel, and including a pump to pump said liquids through a tube containing said monitor, and including means to flush said tube with water.

3. An organic waste management system as set forth in claim 1 wherein said data is delivered to and sorted in memory in communication with a central processing unit and wherein said regulator and said delivery system are in communication therewith.

4. An organic waste management system as set forth in claim 2 wherein said data is delivered to a remote location.

5. An organic waste management system as set forth in claim 1 wherein said delivery system also delivers buffers in response to data regarding said pH level.

6. An organic waste management system as set forth in claim 1 including a mechanism to decrease the temperature of said waste liquids and solids in said vessel by introduction of cold water.

7. An organic waste management system as set forth in claim 1 wherein said data received by said regulator is delivered to and received by a remote data collector.

8. An organic waste management system as set forth in claim 1 wherein said monitor communicates externally either unidirectionally or bidirectionally.

9. An organic waste management system which comprises:
   a collection vessel for receipt of fat, oil or grease;
   a monitor having a sensor to monitor the dissolved oxygen, a sensor to monitor the pH level, and a sensor to monitor the temperature of said fat, oil or grease in the collection vessel and generate data therefrom;
   means to deliver enzymes in measured doses from a separate fermentation chamber to said collection vessel in response to said data;
   means to apply oxygen or air to said vessel in response to said data;
   means to control the amount of said fat, oil or grease in the vessel; and
   means to control the pH level in the vessel and discharge therefrom.

10. An organic waste management system as set forth in claim 9 further comprising a means for controlling biochemical oxygen demand by optimizing dissolved oxygen, pH level and temperature in said collection vessel.

11. An organic waste management system as set forth in claim 9 wherein said sensors are located outside said liquids and solids in said vessel, and including a pump to pump said liquid through a tube containing said sensors, and including means to flush said tube with water.

* * * * *